(12) United States Patent
Kitai et al.

(10) Patent No.: US 6,501,061 B1
(45) Date of Patent: Dec. 31, 2002

(54) LASER CALIBRATION APPARATUS AND METHOD

(75) Inventors: Anton Theodore Kitai, Ottawa; Ian James Miller, Gloucester; Robert Glenn Parker, Nepean, all of (CA)

(73) Assignee: GSI Lumonics Inc., Kanata (CA)

( * ) Notice: Subject to any disclaimer, the term of this patent is extended or adjusted under 35 U.S.C. 154(b) by 0 days.

(21) Appl. No.: 09/558,367

(22) Filed: Apr. 26, 2000

Related U.S. Application Data
(60) Provisional application No. 60/131,138, filed on Apr. 27, 1999.

(51) Int. Cl.[7] .................................................. G01J 1/32
(52) U.S. Cl. .................. 250/205; 250/559.3; 250/201.1
(58) Field of Search ............................. 250/205, 201.1, 250/206.2, 234, 235, 236, 559.23, 559.3, 559.33

(56) References Cited

U.S. PATENT DOCUMENTS

| | | | |
|---|---|---|---|
| 4,532,402 A | 7/1985 | Overbeck .............. 219/121.78 |
| 4,769,523 A | * 9/1988 | Tanimoto et al. ......... 219/121.6 |
| 5,210,410 A | * 5/1993 | Barrett ........................ 250/234 |
| 5,751,585 A | 5/1998 | Cutler et al. ................. 700/161 |
| 5,832,415 A | * 11/1998 | Wilkening et al. ............ 702/86 |
| 5,847,960 A | 12/1998 | Cutler et al. ................. 700/187 |

* cited by examiner

Primary Examiner—Robert H. Kim
Assistant Examiner—Courtney Thomas
(74) Attorney, Agent, or Firm—Hoffman, Warnick & D'Alessandro LLC; John A. Merecki (57) ABSTRACT

A method and of determining scanner coordinates to accurately position a focused laser beam. The focused laser beam is scanned over a region of interest (e.g. an aperture) on a work-surface by a laser scanner. The position of the focused laser beam is detected by a photodetector either at predetermined intervals of time or space or as the focused laser beam appears through an aperture in the work surface. The detected position of the focused laser beam is used to generate scanner position versus beam position data based on the position of the laser scanner at the time the focused laser beam is detected. The scanner position versus beam position data can be used to determine the center of the aperture or the scanner position coordinates that correspond with a desired position of the focused laser beam.

31 Claims, 7 Drawing Sheets

PLAN VIEW

LASER CALIBRATION APPARATUS AND METHOD

CROSS-REFERENCE TO RELATED APPLICATIONS

This application claims the benefit of U.S. Provisional Application No. 60/131,138 filed Apr. 27, 1999.

FIELD OF THE INVENTION

This invention relates to the field of laser calibration, and more particularly to systems for positioning a focused laser beam over a processing area with high precision.

BACKGROUND OF THE INVENTION

In many material processing applications it is necessary to position a focused laser beam over a processing area with very high precision. Various prior art methods have been proposed to determine the position of a moveable laser beam.

One method uses a charge coupled device (CCD) camera and a small portion of the processing beam to indirectly measure changes in the beam position. This approach only works well as a correction for small changes to a substantially static beam since the split off portion of the beam is focused through a different lens than the one used for processing.

Another method monitors scattered light from the work piece with a CCD camera to determine the actual position of the beam.

Yet another method processes a test part with an array of features; measures the processed part and compares the actual feature positions with the planned locations; and uses the difference to calculate a table of correction factors.

Further, beam profilers often use a moving aperture/detector assembly to determine the shape of a laser beam, but these devices are not concerned about referencing the beam shape to the coordinate system of a material processing machine, for example.

SUMMARY OF THE INVENTION

It is an object of the present invention to improve laser beam position calibration methods and systems.

It is an object of the present invention to provide an automatic and consistent laser beam position calibration method and system.

It is an object of the present invention to provide a method and system for determining scanner coordinates to position a laser beam.

In accordance with one aspect of the present invention there is provided a method of correlating scanner position coordinates of a laser scanner with beam position coordinates of a focused laser beam to improve position accuracy of the focused laser beam, said method comprising the steps of: scanning the focused laser beam over a region of interest on a work surface; detecting the focused laser beam received at a photodetector contiguous with the work surface, wherein a location of the detected focused laser beam produces beam position coordinates; and forming scanner position versus beam position data by creating associations between beam position coordinates and scanner position coordinates corresponding to the position of the laser scanner when the focused laser beam is detected.

In accordance with another aspect of the present invention there is provided a method of improving precision when positioning a focused laser beam, said method comprising the steps of: scanning the focused laser beam over a region of interest on a work surface; detecting the focused beam received at a photodetector contiguous with the work surface, wherein a location of the detected focused laser beam produces beam position coordinates; forming scanner position versus beam position data by creating associations between beam position coordinates and scanner position coordinates corresponding to a position of the laser scanner when the focused laser beam is detected; determining beam position coordinates for a desired position for the focused laser beam; and calculating desired scanner position coordinates that correspond with the desired position based on the scanner position versus beam position data.

In accordance with a further aspect of the present invention there is provided a method for determining laser scanner position coordinates to position a focused laser beam comprising the steps of: scanning the focused laser beam over an aperture on a work surface; monitoring power transmitted to through the aperture by the focused laser beam using a photodetector to generate scanner coordinate versus photodetector signal data; deriving from the scanner position versus beam position data, scanner coordinates corresponding to a position of the center of the aperture.

In accordance with yet another aspect of the present invention there is provided a method of determining the features of an aperture on a machining plane using a laser beam comprising the steps of: scanning the laser beam about the aperture on the machining plane; collecting light passing through the aperture on a detector to determine a profile of detector signal versus scanned beam position; and defining a threshold of the detector signal thereby defining scanned beam positions defining the edges of the aperture.

In accordance with an additional aspect of the present invention there is provided an apparatus for improving position accuracy of a focused laser beam comprising: a laser scanner having scanner position coordinates for scanning the focused laser beam over a region of interest on a work surface; a photodetector for detecting when the focused laser beam is received at the work surface, wherein a location of the detected focused laser beam produces beam position coordinates; and a data forming means for forming scanner position versus beam position data by creating associations between beam position coordinates and scanner position coordinates corresponding to the position of the laser scanner when the focused laser beam is detected.

In accordance with a further aspect of the present invention there is provided an apparatus for improving precision when positioning a focused laser beam comprising: a laser scanner having scanner position coordinates for scanning the focused laser beam over a region of interest on a work surface; a photodetector for detecting when the focused laser beam is received at the work surface, wherein a location of the detected focused laser beam produces beam position coordinates; a data forming means for forming scanner position versus beam position data by creating associations between beam position coordinates and scanner position coordinates corresponding to the position of the laser scanner when the focused laser beam is detected; and a position determining means for determining the beam position coordinates for a desired position for the focused laser beam and calculating desired scanner position coordinates that correspond with the desired position based on the scanner position versus beam position data.

In accordance with an additional aspect of the present invention there is provided an apparatus for determining laser scanner position coordinates to position a focused laser beam comprising: means for scanning the focused laser beam over an aperture on a work-surface; means for monitoring power transmitted through the aperture by the focused laser beam using a photodetector to generate scanner position versus beam position data; and means for deriving from the scanner position versus beam position data, scanner coordinates corresponding to the position of the center of the aperture.

In accordance with another aspect of the present invention there is provided an apparatus for determining the features of an aperture on a machining plane using a laser beam comprising the steps of: means for scanning the laser beam about the aperture on the machining plane; means for collecting light passing through the aperture on a photodetector to determine a profile of photodetector signal versus scanned beam position; and means for defining a threshold of the photodetector signal thereby defining scanned beam positions defining the edges of the aperture.

BRIEF DESCRIPTION OF THE DRAWINGS

The present invention will be described in conjunction with the drawings in which.

DETAILED DESCRIPTION OF EMBODIMENTS OF THE INVENTION

The laser calibration apparatus and method will be described in conjunction with a material processing apparatus disclosed in Applicant's co-pending provisional U.S. application Ser. No. 60/131,139 filed Apr. 27, 1999 titled "A system and method for material processing using multiple laser beams", said application being incorporated herein by reference.

Figure 1:
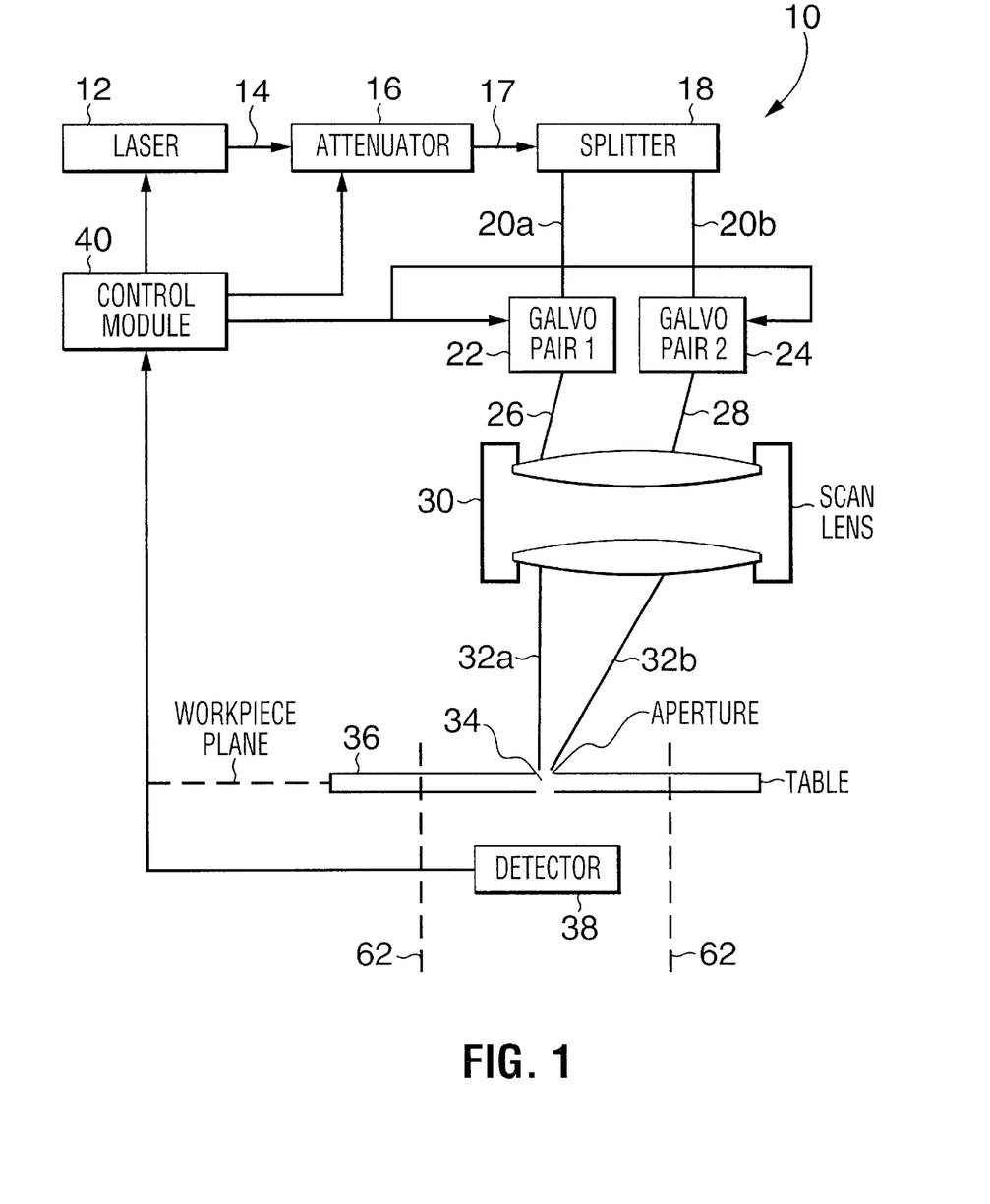
FIG. 1 shows a schematic illustration of a material machining apparatus incorporating the laser calibration system of the present invention.

An example of a general material processing apparatus 10 incorporating the laser calibration apparatus of the present invention is illustrated in FIG. 1. The apparatus 10 includes a source laser 12 to generate a single laser beam 14. The beam 14 is passed to an attenuator 16 to reduce the energy density of the beam 14 to produce an attenuated beam 17. The attenuated beam 17 passes to a splitter 18 for splitting the beam 17 into two components 20a, 20b. Beam 20a passes to a first scanning positioning system such as a galvanometer (galvo) pair 22 to produce beam 26 and beam 20b passes to a second scanning positioning system such as galvanometer pair 24 to produce beam 28. The galvos 22 and 24 are multiple reflector devices used to adjust the angle of the output beams 26 and 28.

The beams 26 and 28 are directed through a scan lens 30 to produce a pair of output beams 32a,b. The output beams 32a,b are directed to an aperture 34 in an X-Y table 36. A detector 38 is mounted in-line and proximate to the aperture 34 in the X-Y table 36. A control module 40 is used to control the operation of the detector 38, the laser 12, the attenuator 16, the splitter 18 and the galvo pairs 22 and 24. It is understood by those skilled in the art of the invention that the same method would equally apply to a single beam or more than two beams.

Figure 2A:
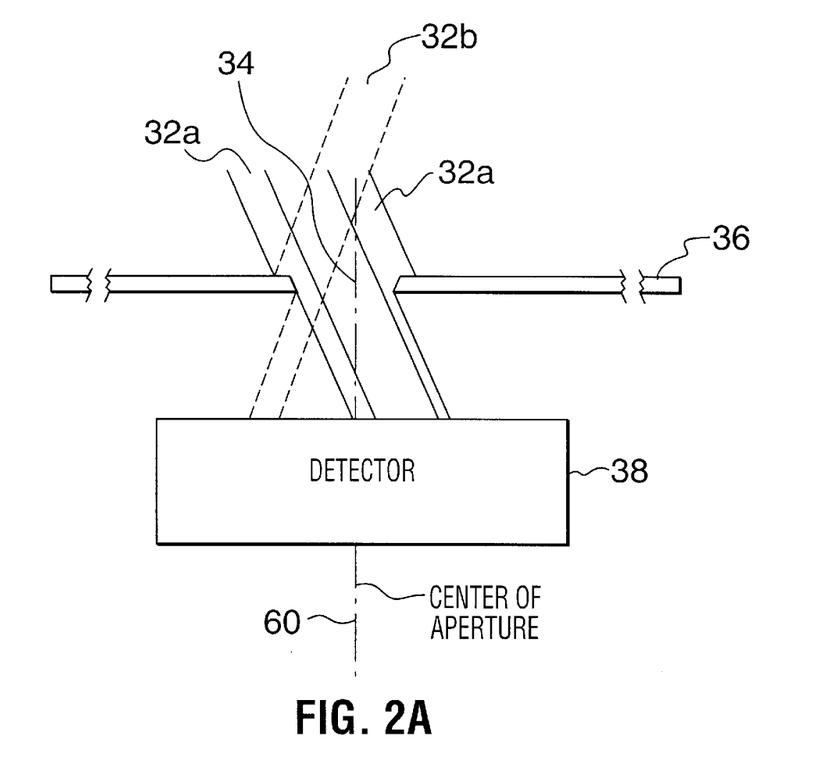
FIG. 2A is an enlarged view of the aperture/detector configuration shown in FIG. 1.
Figure 2B:
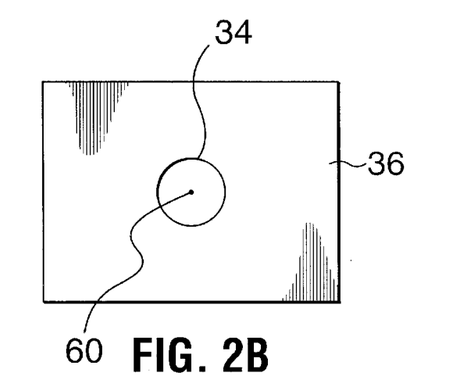
FIG. 2B is a top plan view of the aperture on the table of FIG. 2A.

An enlarged view of the aperture 34 and detector 38 is illustrated in FIGS. 2A and 2B. The calibration method of the present invention detects the position of the moveable focused laser beam 32a,b relative to the known position of the aperture 34 by using the detector 38 with the aperture 34 placed over it.

The beam 32a or b is scanned over the aperture 34 while the control module 40 monitors the detector 38. Signals passed from the detector 38 to the control module 40 are used to control the beam 32a or b by determining a profile of detector signal versus scanner position. By recording a scan position coincident with the edge of the aperture 34 that corresponds to a user-defined threshold level on the detector 38, the scan position that corresponds to a center 60 of the aperture 34 can be determined as being midway between scan positions where a threshold level is detected. For example:

x-center 60=(X-position-left threshold+X-position-right threshold)/2

Figure 3A:
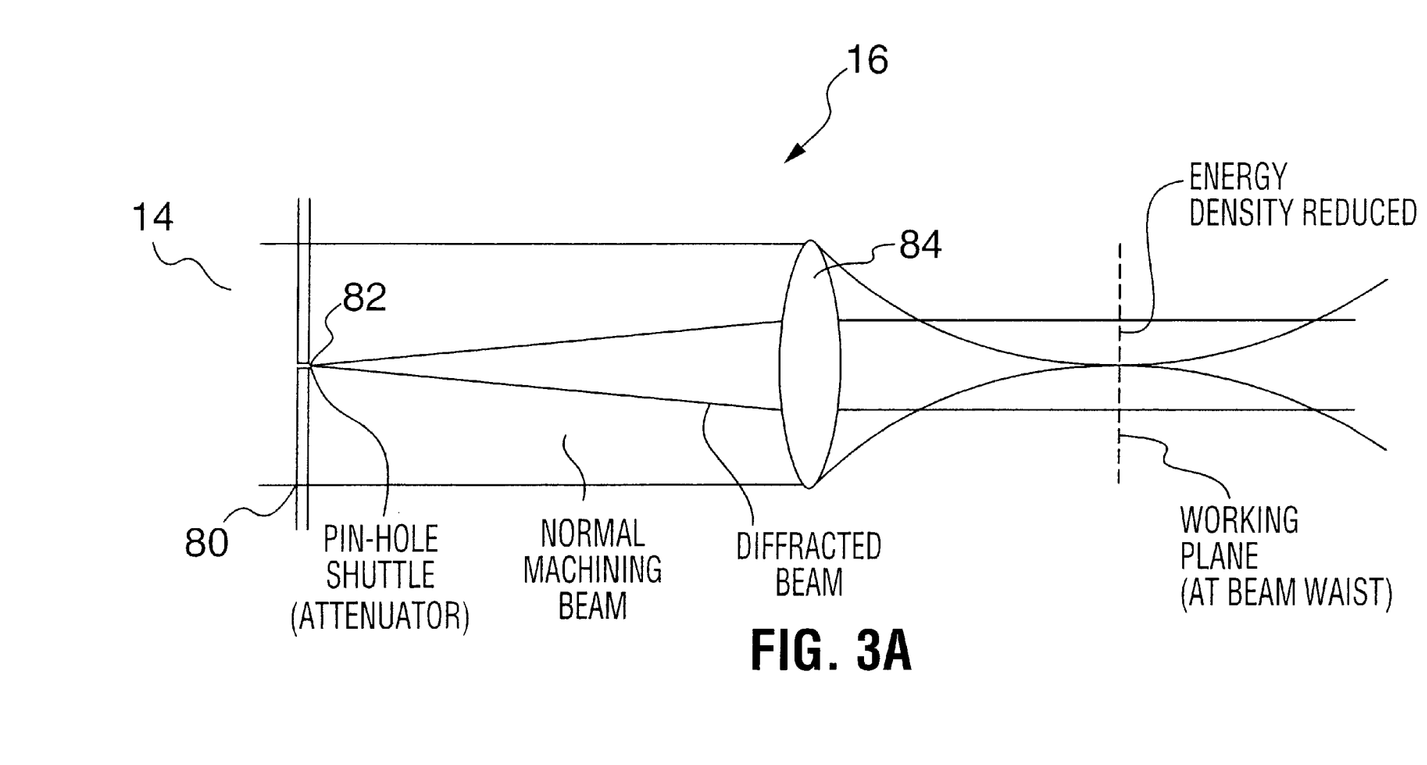
FIG. 3A is a schematic illustration of the attenuator of FIG. 1.
Figure 3B:
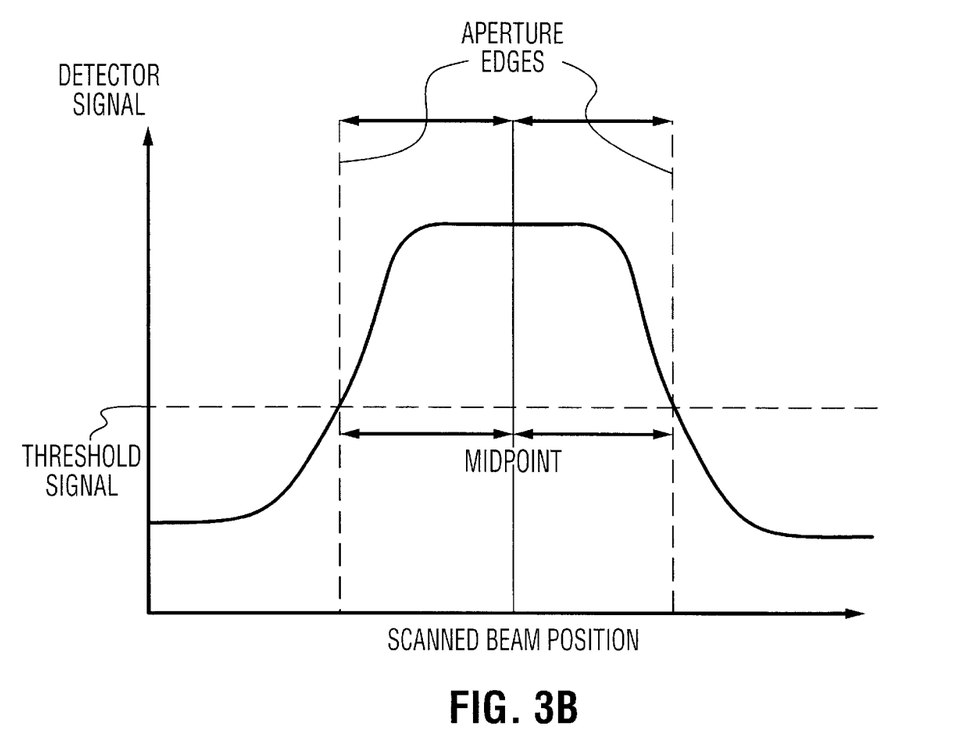
FIG. 3B is a graphical representation of a technique used to find the center position of an aperture.

A graphical representation of a typical implementation of this procedure is shown in FIG. 3B.

Other formulas, well known to those skilled in the art, can be used to calculate the x-center 60 to compensate for non-uniformities in the shape of the beams 32a,b or to improve signal to noise ratio. A second scan of the laser beam 32a or 32b across the aperture 34 is made in a perpendicular direction to determine the scan position that corresponds to the y-center of the aperture 34. From these two perpendicular scans of the laser beam 32a or 32b, the x and y scanner coordinates to precisely place the beam 32a or 32b at the known location of the center 60 of the aperture 34 are calculated. By setting coordinates for galvo pairs 22 or 24 at these calculated coordinates, the laser beam 32a,b can be placed at the same position that the aperture 34 was in during the original scans.

An alternative method for finding the center of the aperture is to scan the beam 32a,b across the aperture 34 to locate multiple points (scanner X, Y coordinates are recorded for each point) on the circumference of the aperture 34, or along the perimeter of the aperture 34 if the aperture 34 is not circular, and then to use formulas, well known to those skilled in the art, to calculate the center 60 of the aperture 34.

In one embodiment of the present invention, where two galvanometer mirrors are used to scan the laser beam 32a or 32b, the scanner coordinates would correspond to the angle of the two galvanometer mirrors in the galvanometers 22, 24. However, any beam scanning method (e.g. polygon, acousto-optic) can be used to direct the laser beams 20a,b through the scan lens 30.

Figure 2C:
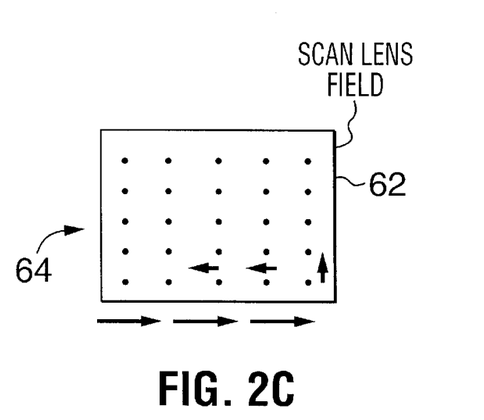
FIG. 2C is a top plan view of the grid layout used in the laser calibration method of the present invention.

After locating the scan position that corresponds to the center 60 of the aperture 34, the aperture 34 is moved to a different location within an operating field 62 of the scan lens 30. Typically the aperture 34 is moved by a precision motion stage with a resolution on the order of 1 µm. At the new aperture position, the aperture locating process (discussed above) is repeated to determine the galvanometer 22, 24 position that corresponds to the new location. Through a series of cycles, the scanner coordinates that correspond to a grid 64 of aperture positions (see FIG. 2C) is determined. From the grid 64, the scanner coordinates for any point within the field 62 can be calculated using well known interpolation or extrapolation methods. The resolution and accuracy of the technique is only limited by the resolution of the scanning mechanism and the aperture positioning equipment.

The attenuator 16 is used to reduce the intensity (without deviation) of the laser beam 14. A method according to the invention is to place a shuttle 80 having a small aperture 82 substantially in the center of the laser beam 14 before a focusing lens 84 during the aperture processing method discussed above.

Placing the aperture 82 before the lens 84 ensures that the intensity is significantly lower at the lens focus, thus reducing or eliminating the problem of damage to the detector 38 or aperture 34. The aperture 82 reduces the intensity on any workpiece (positioned on the X-Y table 36) by two mechanisms. First the aperture 82 is smaller than the laser beam 14, which decreases the amount of energy that is focused by the lens 84. Secondly, the aperture 82 reduces the size of the laser beam 14 at the focusing lens 84. This effect increases the size of the laser beam 14 at the lens focus (as illustrated in FIG. 3A).

An example is provided below:

Spot diameter at focus: ≈2.44*(focal length)*(wavelength)/(spot diameter at lens).

Even with non-ideal lasers and lenses the above formula is substantially applicable. For example, if the aperture 82 placed in the beam 14 before the focusing lens 84 has a diameter equal to 10% of the beam diameter at that point, the intensity (W/cm$^2$) of the beam 32a,b at the working plane will be reduced by a factor of about 10,000. Because the light transmitted by the aperture 82 is completely undeviated, the center of the focused beam will correspond substantially to the center of the beam that is not attenuated by the pre-lens aperture.

An alternative method for attenuating the laser beam 14 is to place a partially transmitting optic, or a series of partially transmitting optics in the beam prior to the lens. To be effective, the partial transmitter must not deviate the angle or position of the transmitted beam. Another alternative method is to turn down the laser power to a sufficiently low level to avoid damaging the target aperture after the lens, but this is often not possible due to restricted dynamic operating range of typical available lasers.

Figure 4A:
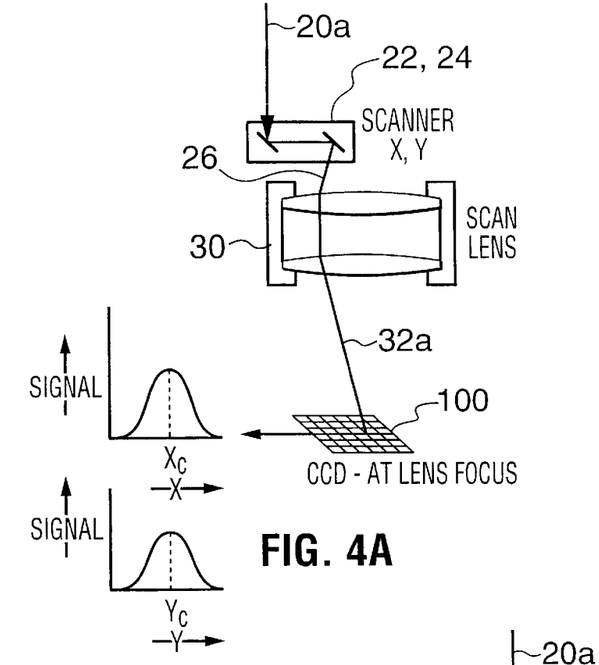
FIG. 4A shows a schematic representation of a two dimensional array detector according to an embodiment of the present invention.

As a further alternative, instead of a single detector 38, an array of photodetectors 100 (e.g. a CCD) is used to detect the laser beam 14 without using the aperture 34 as shown in FIG. 4A. The arrangement shown in FIG. 4A provides an accurate focused beam position without the need to scan the laser beam 14. The center position of the focused laser beam may be determined by calculating the centroid of the illuminated pixels, weighted by the intensity in each pixel. The calculation may be performed at periodic intervals (of time or increments of movement) or at preset scanner coordinates.

Figure 4B:
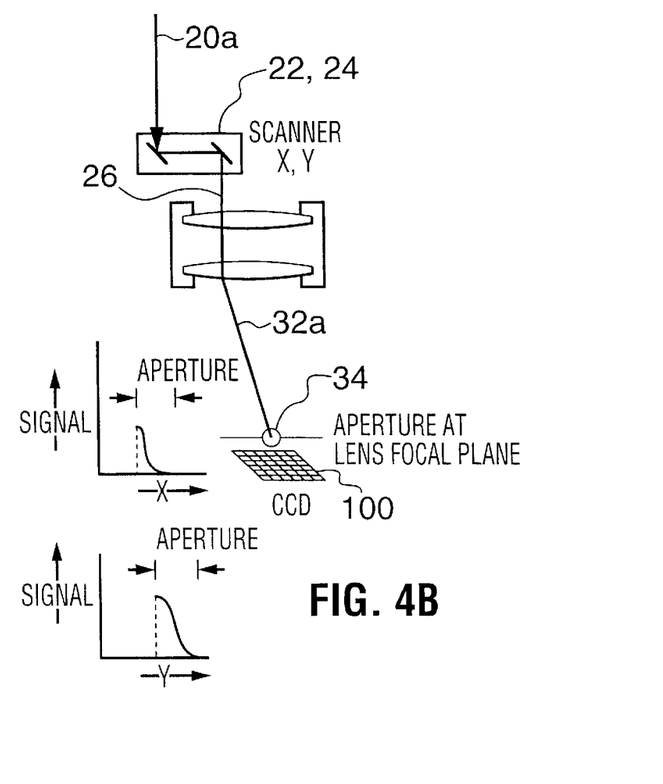
FIG. 4B shows a schematic representation of a two dimensional array detector with aperture according to another embodiment of the present invention.

Alternatively, the aperture 34 can be used with a multi-element detector 100 (i.e. two dimensional array detector) as shown in FIG. 4B. In this case the aperture 34 could be used as a reference mark for determining the position of the focused beam. The signals from the multi-element detector 100 may either be summed and compared to a reference threshold or be examined individually and used to calculate the beam centroid directly.

Figure 4C:
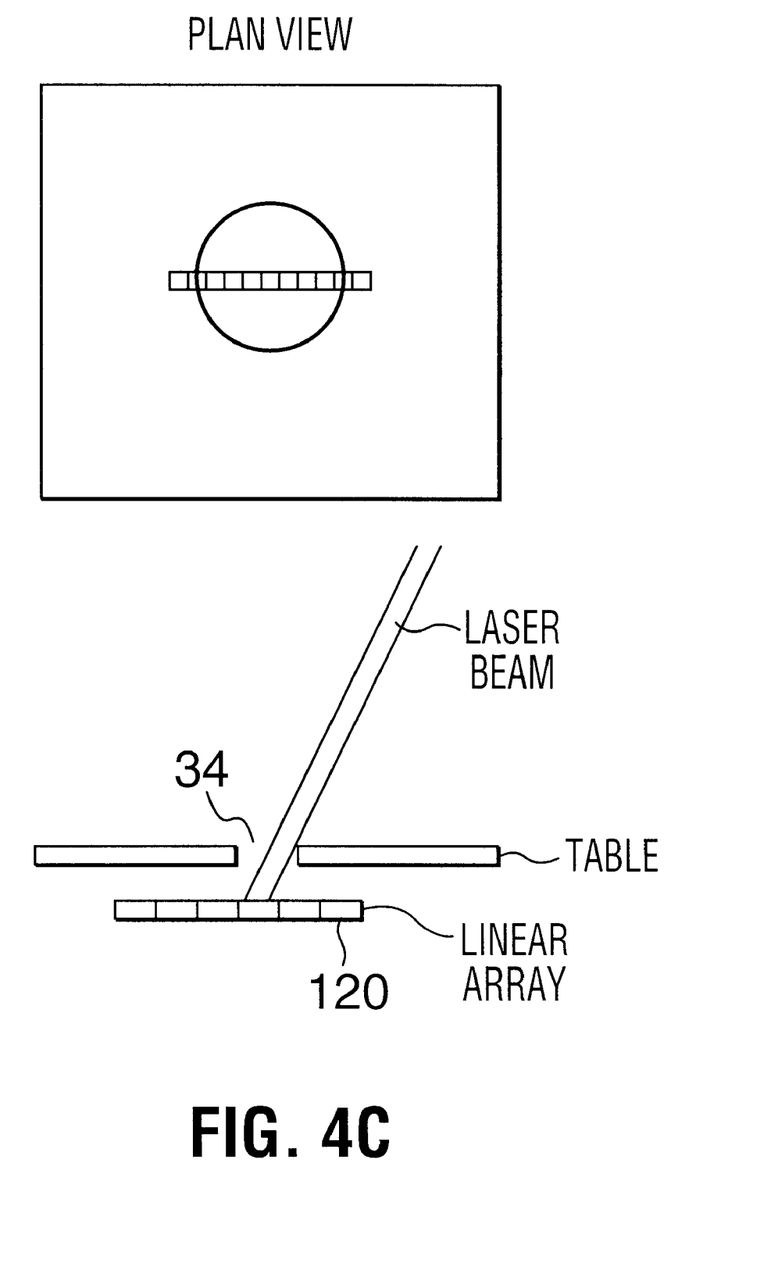
FIG. 4C shows a schematic representation of a linear array detector according to another embodiment of the present invention.

Using a linear array detector 120 or a two dimensional array 100 enables simultaneous determination of scanner coordinates for two scanners as shown in FIG. 4C. Each scanner directs a beam to slightly offset positions so that there are two separate focused spots on the detector 120. The control module 40 determines the center position of each beam and saves the scanner coordinates that move the laser beam to the measured location. In the arrangement of FIG. 4C, the calibrated points in the lens field are not necessarily on the same regular grid for different scanners. The interpolation and extrapolation routines needed to calculate scanner positions to direct each beam to processing sites will be slightly different as a result.

With reference to the system disclosed in Applicant's co-pending application referenced above for drilling holes/vias using multiple laser beams and to FIG. 1 of present application, the beams 32a,b drill holes (or blind vias) in a panel fixed to the X-Y table 36. The beams 32a,b are focused in fields on the panel by at least one scan lens 30 mounted above the panel. More than one beam can be focused through a single scan lens 30. Pairs of galvanometers 22, 24 mounted above the scan lens 30 scan the laser beams 32a,b through the lenses creating fields (for example, a typical size would be 2"×2") on the panel below (i.e. resting on the table 36).

The position of the galvanometers 22, 24 is commanded by a control signal from the control module 40. The control module 40 is responsible for moving the panel in the X-Y plane (using the table 36), controlling the height of the scan lens 30 in the Z axis (to adjust the laser beam focus at the panel), commanding the galvos 22,24 that position the laser beams 32a,b in the X-Y plane and turning the laser 12 on and off as required during drilling. Imperfections in the lenses, tolerance build up in all the optical components and non-linearities in the galvo control signals create distortions in the field; therefore, a means to accurately calibrate the system is required.

In one embodiment, the apparatus and method of the present invention provides an automated process to accurately and automatically calibrate the position of the laser beams in X-Y fields.

The method of the present invention is used to calibrate beams either independently or simultaneously. The system is able to automatically test the calibration of the beam(s) to determine if calibration is required and perform calibration on a specific beam if necessary or it can perform the calibration at predetermined intervals. The system also allows operators to request an automatic calibration or automatic test to be initiated as required The calibration method uses the detector 38 to locate the laser beam 32a,b as it is scanned in the X-Y field 62 (for example, a field of 2"×2"). The field 62 is a plane located at the surface of the panel where holes are drilled. There is one field 62 per scan lens 30. The detector 38 is mounted to the X-Y table 36, which can provide accurate position information through feedback to the control module 40 whenever the laser beam 32a,b is sensed.

The aperture 34 positioned above the detector 38 is used to define the exact location reference of the detector 38. The diameter of the aperture 34 could be larger or smaller then the diameter of the laser beam 32a,b. It is the edges of the aperture 34 that are located as the laser beam 32a,b is scanned in the field 62. The Z axis is used to move that scan lens 30 to position the focus of the laser beam 32a,b at or near the surface of the aperture 34. The calibration process begins by the control module 40 moving the X-Y table 36 to position the photo sensor/aperture combination in the field 62 to be calibrated.

The control module 40 then turns on the laser 12 and commands the galvos 22, 24 to scan the laser beam 32a,b in the field 62. When the laser beam 32a,b is sensed by the detector 38 the control module 40 uses a search algorithm (see FIG. 3B for an example) to find the edges of the aperture 34. When each edge is located the control module 40 records the commanded galvo position and the table position and uses this information to calculate scanner coordinates for that location in the field 62. The control module 40 then moves the X-Y table 36 to another location in the field 62 and repeats the process to find the aperture edges.

This process is repeated at many locations (for example 25 positions in a 2"×2"area—see FIG. 2C) in the field 62 as required to create an accurate mapping of the field 62 in scanner coordinates. The control module 40 uses a control algorithm that includes at least a first order polynomial to process the collected position information to interpolate a coordinate map of the field 62. The coordinate map can then be used to correct field distortions by extrapolating new galvanometer commanded positions for the targeted positions from the scanner coordinates for the measured positions.

Figure 5:
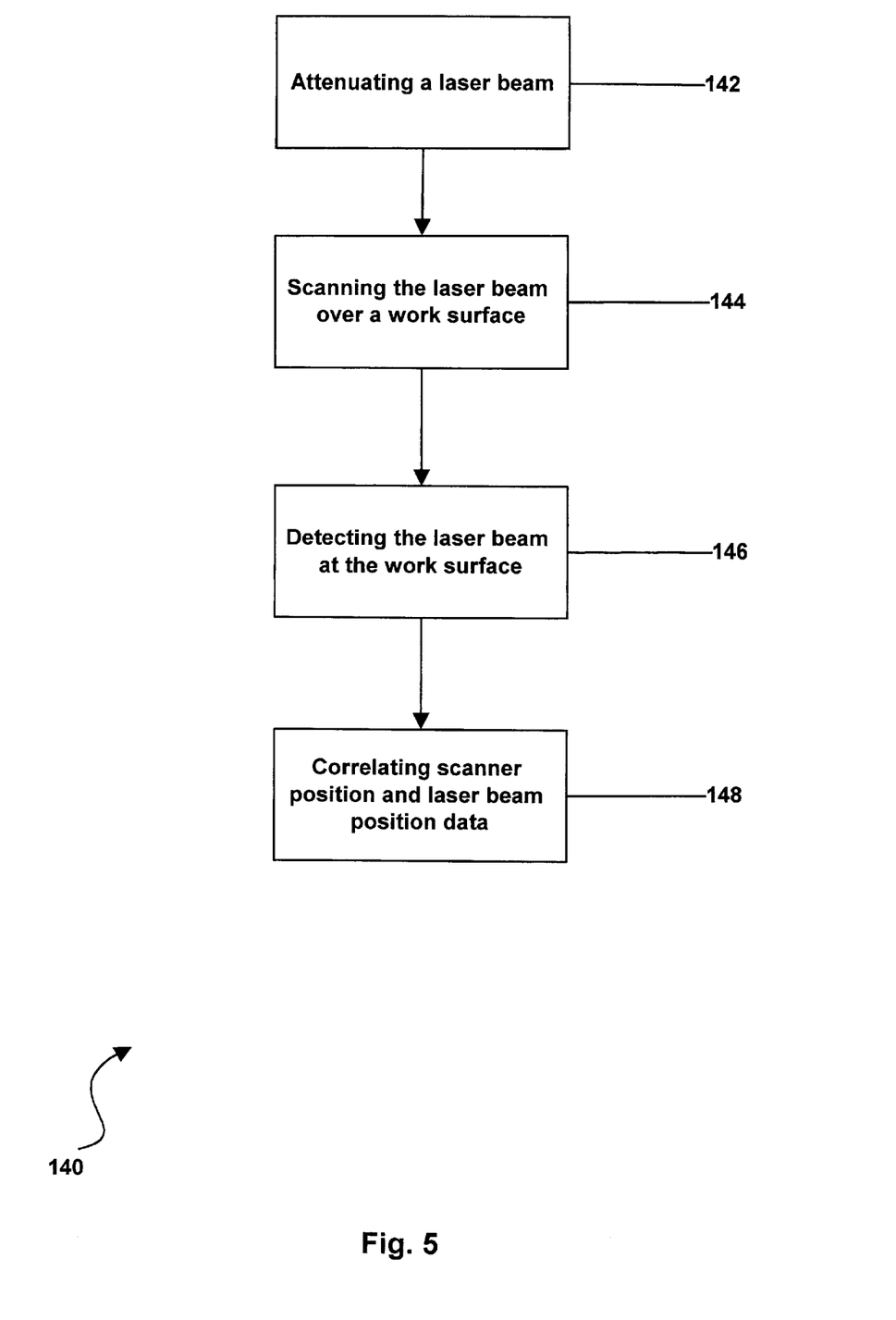
FIG. 5 shows a method of calibrating a laser in accordance with an embodiment of the present invention.

FIG. 5 is a flowchart summarizing a method 140 of calibrating the laser 12 such that a correlation between the position of the laser beam 32a,b and the position of the laser scanner 22, 24 is established. The laser beam 14 is attenuated at step 142 to reduce the energy density to avoid damaging the photodetector 38. The laser beam 32a,b is scanned over the work surface 36 at step 144 where it is detected in step 146. The position of the laser beam 32a,b when it is detected by the photodetector is correlated with the position of the laser scanner 22, 24 when the laser beam 32a,b is detected. This correlated data is used to determine the center of the aperture 34 on the work surface 36 or the scanner position coordinates that correspond with a desired position of the laser beam 32a,b.

The calibration process can be applied to a single beam or to multiple beams passing through a single scan lens. A single sensor can be used to calibrate multiple fields that have multiple laser beams passing through each scan lens. Multiple sensors can be used to simultaneously calibrate multiple beams and multiple beams passing through multiple scan lenses that make up multiple fields. These options have the following benefits: using fewer sensors will reduce cost, using more sensors will reduce calibration time and test time.

The use of different types of sensors allows lasers with different laser wavelengths (IR, UV, visible) to be calibrated. Calibrating different laser wavelengths allows the system to process different types of materials.

One of the photo sensor apertures (apertures located above the sensors) can be used by a vision system to accurately align laser beams onto a panel fixed to the X-Y table 36. The benefit of using this aperture to locate the vision system with respect the laser beams is that additional tolerance build up is eliminated because the laser beams are calibrated accurately to the edges of the aperture.

If another feature on the X-Y table 36 was used for alignment, then changes in the photo sensor aperture 34 that could possibly cause position errors may not be detected. These changes could be the result of dust or damage to the aperture 34. Another benefit is that it makes it unnecessary to drill holes in panels that would then be used to align the vision system. This reduces the costs of the vision alignment because it eliminates use of consumables (test panels) and operator time to manually install the test panels.

Since the laser beam 32a,b is capable of damaging the photo sensor and the photo sensor aperture a means of protecting them is required. Two methods were discovered that reduce energy density of the laser beam to a level that does not saturate the detector 38 and does not damage the aperture 34. Also, these methods do not result in changes to the laser beams pointing stability which could result in calibration errors. The two methods involved automatically moving an optical attenuating optic or a circular aperture into the laser beam path prior to calibration (see FIG. 3A).

A process to test the calibration of the laser beams was developed that is faster than the calibration process. Instead of collecting calibration information on all points (25) in the field, a subset of points (for example 9) is collected for testing purposes. The data collected during the test is compared to calibration data and test data is created. Reductions in test time contributes to an overall speed increase of the fully automated process.

In sumary, the calibration method/system of the present invention provides the following advantages:

(1) The system is able to operate periodically and automatically without operator intervention;
(2) Time is saved because an operator is not required to install calibration apparatus;
(3) The calibration consistency and repeatability is improved because the process is automated; ,
(4) Calibration data can be collected and logged for statistical investigation;
(5) Calibration data can be passed on to other processes that could use the information in their process such as for scheduling maintenance; and
(6) The overall cost of drilling holes in panels is reduced because the calibration speed increases, there are fewer panel rejects because of increased consistency and no consumables (test panels) are required for calibration.

What is claimed is:

1. A method for correlating scanner position coordinates of a laser scanner with beam position coordinates of a focused laser beam produced by the laser scanner to improve position placement accuracy of the focused laser beam, said method comprising the steps of:

scanning the focused laser over a region of interest on a work surface;

detecting the focused laser beam received at a photodetector contiguous with the work surface, wherein a location of the detected focused laser beam produces beam position coordinates; and forming scanner position versus beam position data by creating associations between beam position coordinates and scanner position coordinates corresponding to the position of the laser scanner when the focused laser beam is detected.

2. The method according to claim 1 wherein the step of scanning the focused laser beam includes the step of using predetermined scanner position coordinates to scan and detect the focused laser beam.

3. The method according to claim 1 wherein the focused laser beam is detected by the photodetector at predetermined intervals.

4. The method according to claim 3 wherein the predetermined intervals are intervals of time.

5. The method according to claim 3 wherein the predetermined intervals are intervals of space.

6. The method according to claim 1 further including the step of decreasing energy density of the focused laser beam prior to scanning the focused laser beam.

7. A method of improving precision when positioning a focused laser beam, said method comprising the steps of:

scanning the focused laser beam over a region of interest on a work surface using a laser scanner having scanner position coordinates;

detecting the focused laser beam received at a photodetector contiguous with the work surface, wherein a location of the detected focused laser beam produces beam position coordinates;

forming scanner position versus beam position data by creating associations between beam position coordinates and scanner position coordinates corresponding to a position of the laser scanner when the focused laser beam is detected;

determining beam position coordinates for a desired position for the focused laser beam; and calculating desired scanner position coordinates that correspond with the desired position based on the scanner position versus beam position data.

8. The method according to claim 7 further including the step of using the desired scanner position coordinates to position the focused laser at the desired position.

9. The method according to claim 7 wherein the step of scanning the focused laser beam includes the step of using predetermined scanner position coordinates to scan and detect the focused laser beam.

10. The method according to claim 7 wherein the focused laser beam is detected by the photodetector at predetermined intervals.

11. The method according to claim 10 wherein the predetermined intervals are intervals of time.

12. The method according to claim 10 wherein the predetermined intervals are intervals of space.

13. The method according to claim 7 wherein the step of calculating the desired scanner position coordinates comprises the steps of:

determining if coordinates of the desired position match beam position coordinates in the scanner position versus beam position data; and if the coordinates of the desired position match beam position coordinates, using scanner position coordinates that correlate with matching beam position coordinates for the desired scanner position coordinates.

14. The method according to claim 7 wherein the step of calculating the desired scanner position coordinates comprises the steps of:

determining if coordinates of the desired position match beam position coordinates in the scanner position versus beam position data; and if the coordinates of the desired position do not match beam position coordinates, using interpolation techniques to determine the desired scanner position coordinates based on beam position coordinates in close proximity to the desired position based on the scanner position versus beam position data.

15. The method according to claim 7 further comprising:

providing the photodetector for detecting the focused laser beam with an array of photodetectors;

calculating an intensity weighted centroid of pixels in the photodetectors illuminated by the focused laser beam; and using the intensity weighted centroid as the beam position coordinates when forming the scanner position versus beam position data.

16. The according to claim 7 further including the step of decreasing energy density of the focused laser beam prior to scanning the focused laser beam.

17. A method for determining laser scanner position coordinates to position a focused laser beam comprising the steps of:

scanning the focused laser beam over an aperture on a work surface;

monitoring power transmitted through the aperture by the focused laser beam using a photodetector to generate scanner position versus beam position data;

deriving from the scanner position versus beam position data, scanner position coordinates corresponding to a position of the center of the aperture.

18. The method according to claim 17 further including the step of decreasing energy density of the focused laser beam prior to scanning the focused laser beam.

19. The method according to claim 17 further comprising providing the photodetector for detecting the focused laser beam with an array of photodetectors, and wherein the scanner position versus beam position data is generated by the step of calculating a position of the focused laser beam relative to an edge of the aperture by evaluating signals from the pixels in the photodetectors generated when the pixels are illuminated by the focused laser beam.

20. A method of determining the features of an aperture on a machining plane using a focused laser beam comprising the steps of:

scanning the focused laser beam about the aperture on the machining plane;

collecting light passing through the aperture on a photodetector to determine a profile of detector signal versus scanned beam position; and defining a threshold of the detector signal thereby defining scanned beam positions defining the edges of the aperture.

21. The method according to claim 20 further including the step of decreasing energy density of the focused laser beam prior to scanning the focused laser beam.

22. An apparatus for improving position accuracy of a focused laser beam comprising:

a laser scanner having scanner position coordinates for scanning the focused laser beam over a region of interest on a work surface;

a photodetector for detecting when the focused laser beam is received at the work surface, wherein a location of the detected focused laser beam produces beam position coordinates; and a data forming means for forming scanner position versus beam position data by creating associations between beam position coordinates and scanner position coordinates corresponding to the position of the laser scanner when the focused laser beam is detected.

23. The apparatus according to claim 22 further including a laser beam attenuator for reducing the energy density of the focused laser beam.

24. An apparatus for improving precision when positioning a focused laser beam comprising:

a laser scanner having scanner position coordinates for scanning the focused laser beam over a region of interest on a work surface;

a photodetector for detecting when the focused laser beam is received at the work surface, wherein a location of the detected focused laser beam produces beam position coordinates;

a data forming means for forming scanner position versus beam position data by creating associations between beam position coordinates and scanner position coordinates corresponding to the position of the laser scanner when the focused laser beam is detected; and a position determining means for determining the beam position coordinates for a desired position for the focused laser beam and calculating desired scanner position coordinates that correspond with the desired position based on the scanner position versus beam position data.

25. The apparatus according to claim 24 further including a laser beam attenuator for reducing the energy density of the focused laser beam.

26. The apparatus according to claim 24 wherein the photodetector for detecting the focused laser beam is an array of photodetectors, and wherein the position determining means comprises:

means for calculating an intensity weighted centroid of pixels in the photodetectors illuminated by the focused laser beam and using the intensity weighted centroid as the beam position coordinates when forming the scanner position versus beam position data.

27. An apparatus for determining laser scanner position coordinates to position a focused laser beam comprising:

means for scanning the focused laser beam over an aperture on a work-surface;

means for monitoring power transmitted through the aperture by the focused laser beam using a photodetector to generate scanner position versus beam position data; and means for deriving from the scanner position versus beam position data, scanner coordinates corresponding to the position of the center of the aperture.

28. The apparatus according to claim 27 further including a laser beam attenuator for reducing the energy density of the focused laser beam.

29. The apparatus according to claim 27 wherein the photodetector is an array of photodetectors, and wherein the means for deriving from the scanner coordinate versus photodetector signal data comprises:

means for calculating a position of the focused laser beam relative to an edge of the aperture by evaluating signals from the pixels in the photodetectors generated when the pixels are illuminated by the focused laser beam to produce scanner position versus beam position data.

30. An apparatus for determining the features of an aperture on a machining plane using a focused laser beam comprising:

means for scanning the focused laser beam about the aperture in the machining plane;

means for collecting light passing through the aperture on a photodetector to determine a profile of photodetector signal versus scanned beam position; and means for defining a threshold of the photodetector signal thereby defining scanned beam positions defining the edges of the aperture.

31. The apparatus according to claim 30 further including a laser beam attenuator for reducing the energy density of the focused laser.

* * * * *